(12) United States Patent
Yamada

(10) Patent No.: US 10,432,107 B2
(45) Date of Patent: Oct. 1, 2019

(54) RECTIFIER CIRCUIT AND ELECTRONIC DEVICE

(71) Applicant: FUJITSU SEMICONDUCTOR LIMITED, Yokohama-shi, Kanagawa (JP)

(72) Inventor: Satoshi Yamada, Kawasaki (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 0 days.

(21) Appl. No.: 15/889,538

(22) Filed: Feb. 6, 2018

(65) Prior Publication Data

US 2018/0287507 A1 Oct. 4, 2018

(30) Foreign Application Priority Data

Mar. 29, 2017 (JP) ................... 2017-064664

(51) Int. Cl.
  *H02M 7/217* (2006.01)
  *G06K 19/07* (2006.01)
  *H02M 1/08* (2006.01)

(52) U.S. Cl.
  CPC ........ *H02M 7/217* (2013.01); *G06K 19/0709* (2013.01); *G06K 19/0723* (2013.01); *H02M 1/08* (2013.01)

(58) Field of Classification Search
  CPC .... H02M 7/217; H02M 1/08; G06K 19/0709; G06K 19/0723
  See application file for complete search history.

(56) References Cited

U.S. PATENT DOCUMENTS

| 6,003,777 A | 12/1999 | Kowalski |
| 2006/0076837 A1 | 4/2006 | Gotoh et al. |
| 2008/0080214 A1* | 4/2008 | Umeda ................... H02J 17/00 363/37 |
| 2015/0263534 A1* | 9/2015 | Lee ....................... H02M 7/219 307/104 |

FOREIGN PATENT DOCUMENTS

| JP | 3-218264 A | 9/1991 |
| JP | 2001-504676 A | 4/2001 |
| JP | 2006-101670 A | 4/2006 |
| JP | 2008-85818 A | 4/2008 |

* cited by examiner

*Primary Examiner* — Kristy A Haupt
(74) *Attorney, Agent, or Firm* — Westerman, Hattori, Daniels & Adrian, LLP

(57) ABSTRACT

A rectifier circuit including a switch element, controls connection and disconnection of an AC input voltage using the switch element to generate an output voltage. The switch element includes an n-channel MOS transistor. The rectifier circuit further includes a booster circuit and a control signal generation unit, and establishes connection to the switch element at a peak portion of the input voltage. The booster circuit is configured to generate and apply a gate control signal including a voltage higher than a threshold voltage of the n-channel MOS transistor to a gate of the n-channel MOS transistor. The control signal generation unit is configured to generate and output a control signal for controlling connection and disconnection of the n-channel MOS transistor to the booster circuit.

14 Claims, 11 Drawing Sheets

RECTIFIER CIRCUIT AND ELECTRONIC DEVICE

CROSS-REFERENCE TO RELATED APPLICATION

This application is based upon and claims the benefit of priority of the prior Japanese Patent Application No. 2017-064664, filed on Mar. 29, 2017, the entire contents of which are incorporated herein by reference.

FIELD

The embodiments described herein are related to a rectifier circuit and an electronic device.

BACKGROUND

In recent years, the importance of rectifier circuits which operate at low voltages is increasing. For example, radio frequency identification (RFID) tags or noncontact IC cards include no batteries and extract power from radio waves (e.g., 13.56-MHz carrier waves) emitted by readers (readers-writers). In electronic devices, as typified by such RFID tags, which extract power from radio waves and operate, P-N junction (PN) diodes or metal-oxide-semiconductor (MOS) transistors are generally used as rectifier circuits.

In, e.g., a rectifier circuit implemented in a diode-connected MOS transistor, when the voltage (Vgs) between the gate and the source of the transistor is higher than the threshold voltage (Vth) of the transistor, the transistor is turned on and a current flows from the drain to the source. When the voltage between the gate and the source is lower than the threshold voltage of the transistor, the transistor is turned off and no current flows. In the diode, a current flows when the anode voltage becomes greater than the cathode voltage by a forward voltage (Vf) or more.

As described earlier, in the rectifier circuit, a threshold voltage exists at which a switch (a transistor or a diode) is connected and disconnected (turned on/off), so conduction loss occurs upon rectification. The conduction loss may be improved by reducing the threshold voltage.

To reduce the threshold voltage, a shot key diode having a low forward voltage is used as the aforementioned diode, and a MOS transistor having a low threshold voltage is used as the aforementioned MOS transistor. However, the manufacture of, e.g., a MOS transistor having a low threshold voltage results in the addition of another process (manufacturing process), thus raising the manufacturing cost.

By the way, in the past, various proposals have been made for rectifier circuits which operate at low voltages.

Patent Document 1: Japanese Laid-open Patent Publication No. 2001-504676

Patent Document 2: Japanese Laid-open Patent Publication No. H03(1991)-218264

Patent Document 3: Japanese Laid-open Patent Publication No. 2008-085818

Patent Document 4: Japanese Laid-open Patent Publication No. 2006-101670

SUMMARY

According to an aspect of the embodiments, there is provided a rectifier circuit including a switch element, controls connection and disconnection of an AC input voltage using the switch element to generate an output voltage. The switch element includes an n-channel MOS transistor. The rectifier circuit further includes a booster circuit and a control signal generation unit, and establishes connection to the switch element at a peak portion of the input voltage. The booster circuit is configured to generate and apply a gate control signal including a voltage higher than a threshold voltage of the n-channel MOS transistor to a gate of the n-channel MOS transistor. The control signal generation unit is configured to generate and output a control signal for controlling connection and disconnection of the n-channel MOS transistor to the booster circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
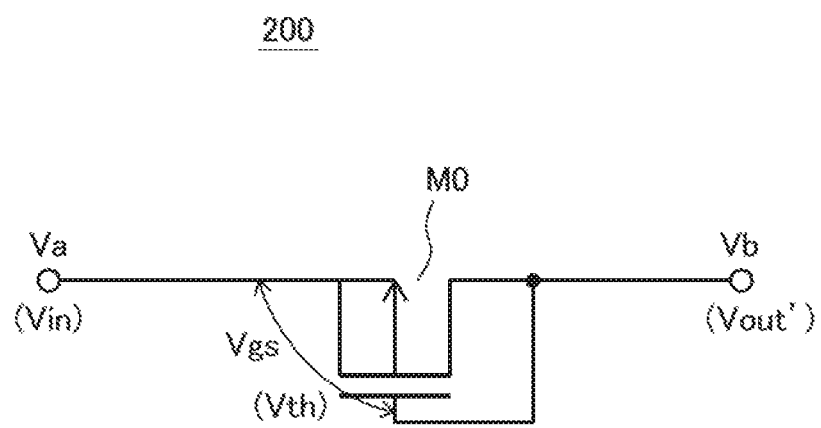
FIG. 1 is a diagram for explaining one exemplary rectifier circuit.

First, before describing embodiments of a rectifier circuit and an electronic device, exemplary rectifier circuits and their problem will be described first with reference to FIG. 1, FIG. 2A and FIG. 2B. FIG. 1 is a diagram for explaining one exemplary rectifier circuit, and for explaining a rectifier circuit 200 implemented in a diode-connected p-channel MOS (pMOS) transistor M0.

As illustrated in FIG. 1, in, e.g., the rectifier circuit 200 implemented in the diode-connected pMOS transistor M0, when the voltage Vgs between the gate and the source of the transistor M0 is higher than the threshold voltage Vth of the transistor, the transistor M0 is turned on. In other words, the transistor M0 is turned on when the source voltage Va (input voltage Vin) becomes higher than the gate voltage (drain voltage Vb: output voltage Vout') by the threshold voltage Vth, and a current flows from the drain to the source.

When the voltage Vgs between the gate and the source is lower than the threshold voltage Vth, the transistor M0 is turned off and no current flows. In the diode, a current flows when the anode voltage becomes greater than the cathode voltage by a forward voltage (Vf) or more. The input voltage Vin is a signal obtained by receiving via an antenna (coil), radio waves applied from, e.g., a reader to, e.g., an RFID tag or a noncontact IC card equipped with the rectifier circuit 200.

Figure 2A:
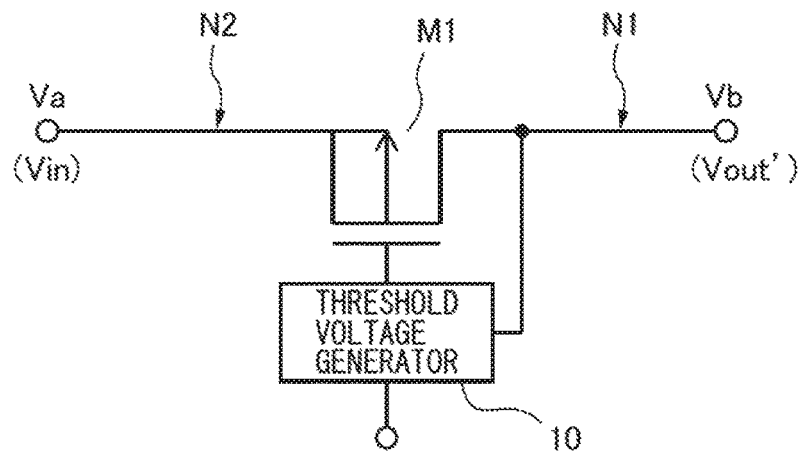
FIG. 2A and FIG. 2B are diagrams for explaining another exemplary rectifier circuit.
Figure 2B:
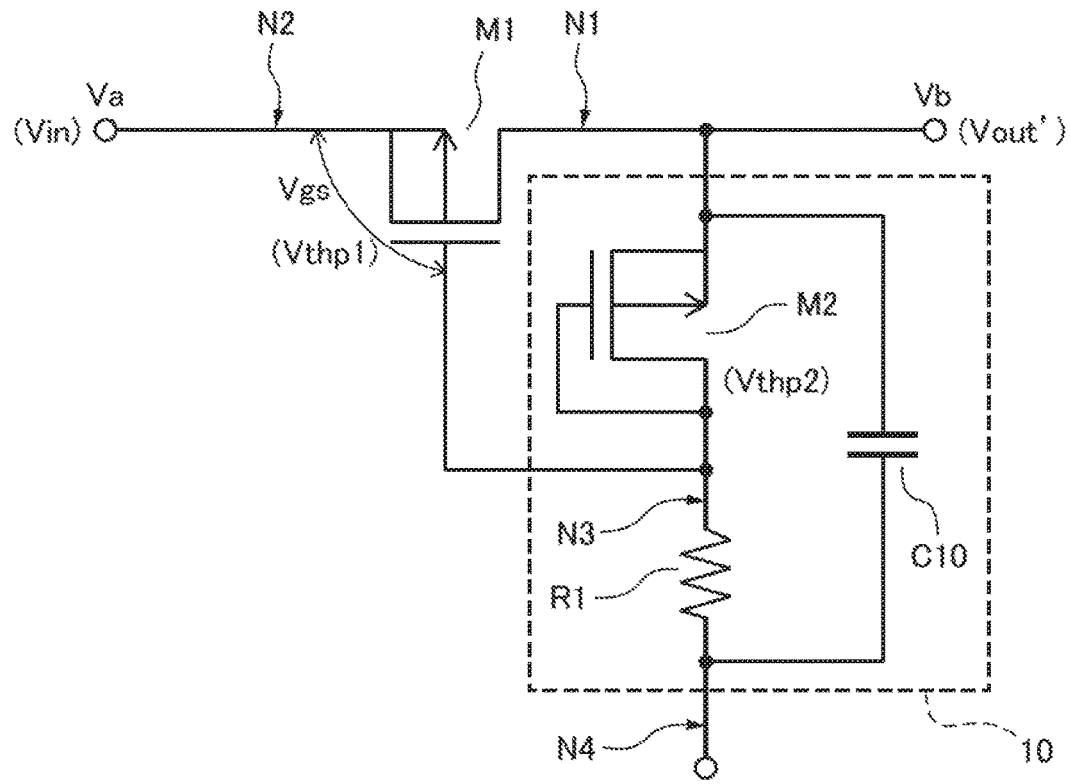

FIG. 2A and FIG. 2B are diagrams for explaining another exemplary rectifier circuit, in which FIG. 2A illustrates another exemplary rectifier circuit and FIG. 2B illustrates one exemplary threshold voltage generator in the rectifier circuit illustrated in FIG. 2A in more detail. Another exemplary rectifier circuit 300 includes, e.g., a threshold voltage generator 10 placed between the gate (node N3) and the drain (node N1) of a pMOS transistor M1, as illustrated in FIG. 2A.

The threshold voltage generator 10 includes a diode-connected pMOS transistor M2, a resistor R1, and a capacitor C10, as illustrated in FIG. 2B. The transistor M2 and the resistor R1 are connected in series between the nodes N1 and N4, and the two ends of the capacitor C10 are connected to the nodes N1 and N4. The capacitor C10 is used to maintain (smooth) the rectified drain voltage Vb of the transistor M1 constant.

With this arrangement, a voltage close to a threshold with reference to the voltage Vb of the drain (node N1) of the transistor M1 may be applied to the gate (node N3) of the transistor M1 to reduce the threshold voltage (Vthp1) at which a current starts to flow between the source and the drain. In other words, conduction loss upon rectification is reduced by lowering the threshold voltage without adding another process (without any rise in manufacturing cost due to the addition of another manufacturing process). The rectifier circuit illustrated in FIG. 2B may be formed as one semiconductor integrated circuit.

The transistors M1 and M2 are formed (manufactured) by adjusting their gate lengths and gate widths so that the threshold voltage Vthp1 of the transistor M1 is slightly greater (greater by a voltage ΔVthp) than the threshold voltage Vthp2 of the transistor M2. In other words, the transistors M1 and M2 may have only slightly different threshold voltages Vthp1 and Vthp2 and therefore may be formed in the same process with only slightly different gate lengths and gate widths.

A voltage lower than that of the node N1 is applied to the node N4 to turn on the transistor M2. Thus, a current flows from the node N1 to the node N4, and the voltage of the node N3 is made lower than that of the node N1 by the threshold voltage Vthp2 of the transistor M2 by the diode-connected transistor M2.

In other words, a voltage lower than that of the node N1 by the threshold voltage Vthp2 of the transistor M2 is applied to the gate of the transistor M1. When the voltage Va (input voltage Vin) of a node N2 becomes higher than the voltage Vb (output voltage Vout') of the node N1 by the voltage ΔVthp, a potential difference corresponding to the threshold voltage Vthp1 occurs between the node N2 and the gate of the transistor M1, and the transistor M1 is turned on. In this manner, the rectifier circuit 300 illustrated in FIG. 2A and FIG. 2B may adjust the threshold voltage Vthp1 of the transistor M1 to a low voltage ΔVthp.

However, during conduction of the transistor M1, the voltage Vgs between the gate and the source of the transistor M1 becomes close to the threshold voltage Vth of the pMOS transistor. Therefore, the potential difference between the nodes N1 and N2 is large, and the conduction loss still remains as high as, e.g., about 0.3 V at 100 μA.

Figure 3:
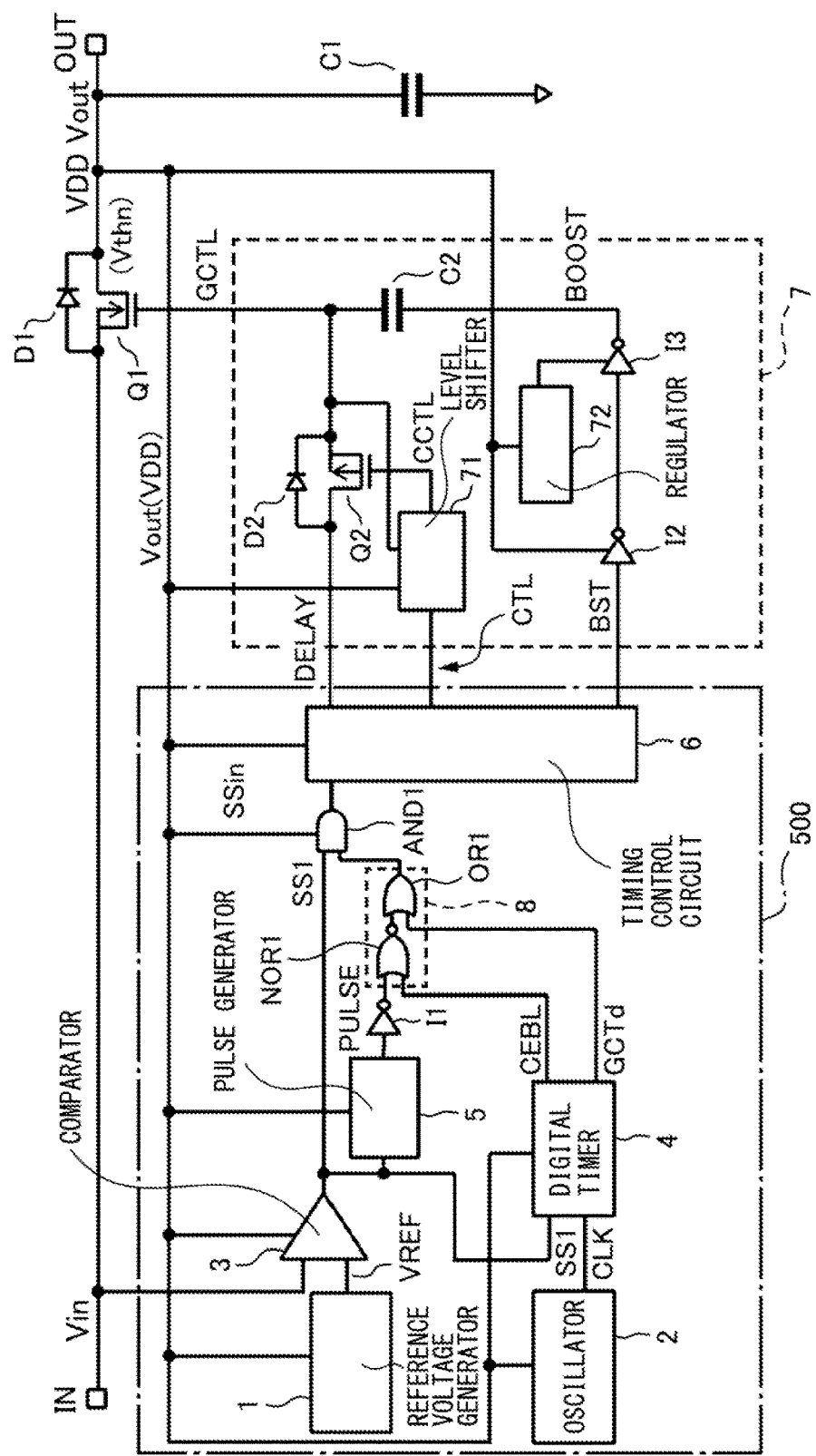
FIG. 3 is a block diagram illustrating one embodiment of a rectifier circuit.
Figure 4:
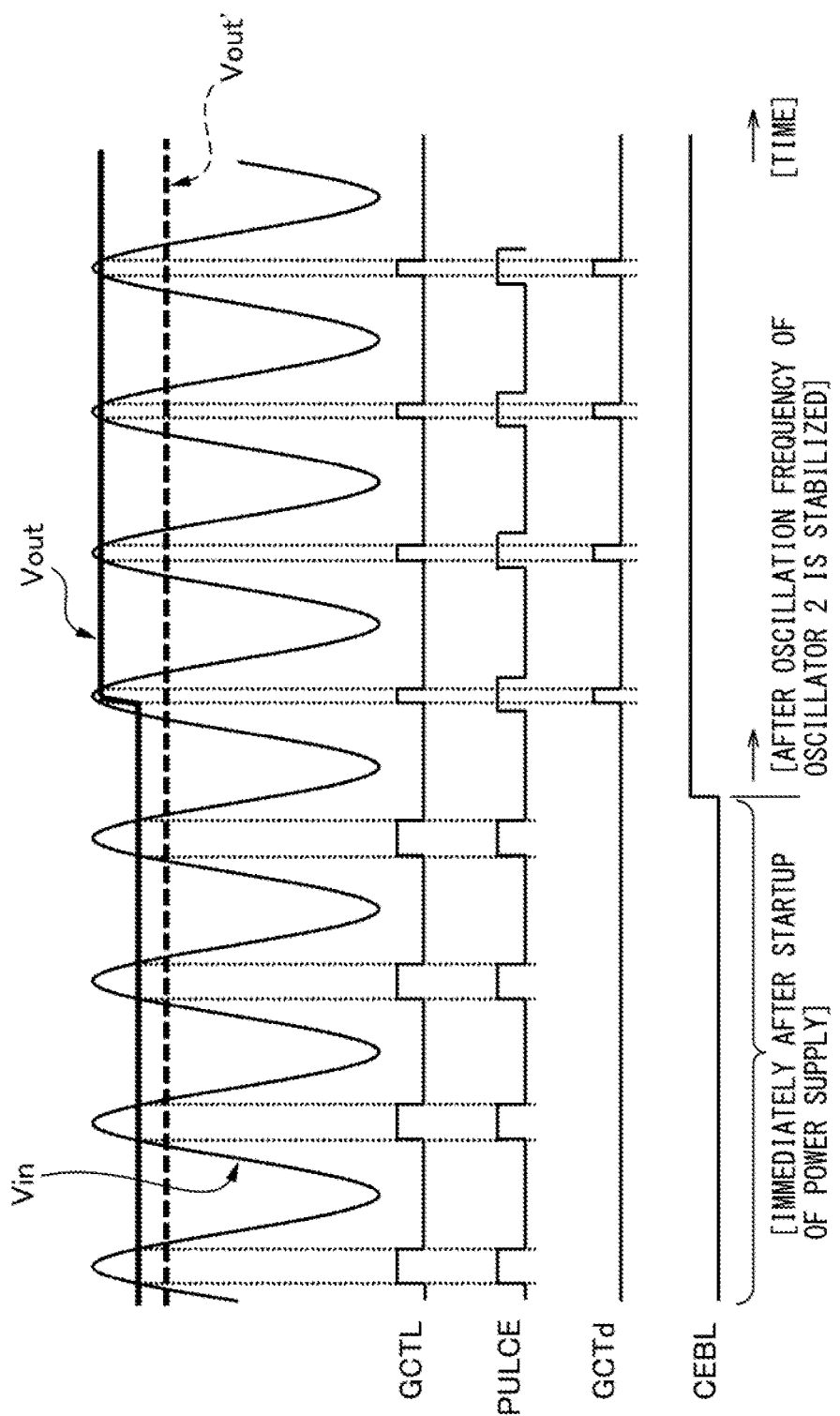
FIG. 4 is a timing chart for explaining the operation of the rectifier circuit illustrated in FIG. 3.
Figure 5:
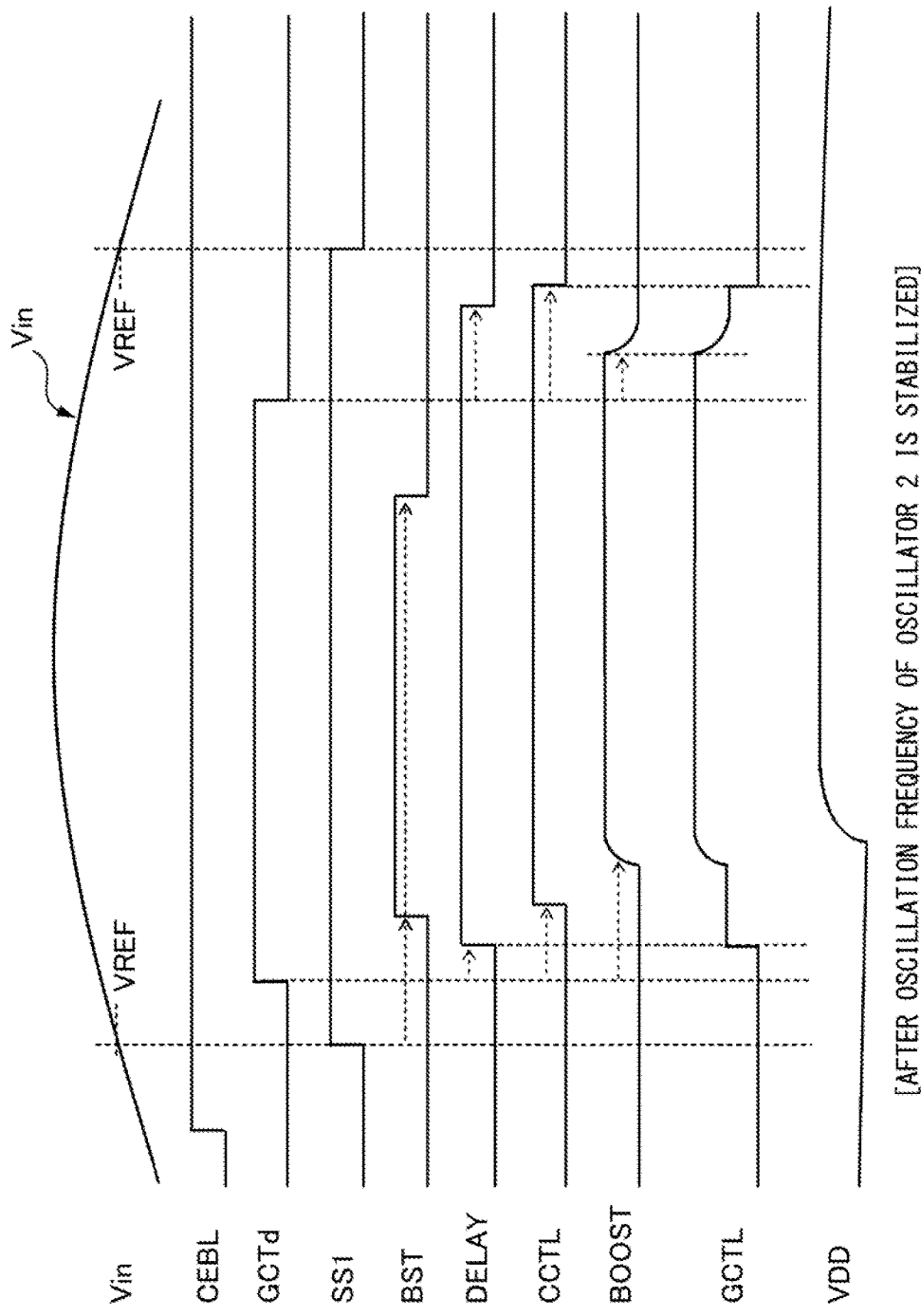
FIG. 5 is a diagram illustrating in close-up a part of the timing chart illustrated in FIG. 4, to explain it in detail.

Below, embodiments of a rectifier circuit and an electronic device will be described in detail below with reference to the accompanying drawings. FIG. 3 is a block diagram illustrating one embodiment of a rectifier circuit, and FIG. 4 is a timing chart for explaining the operation of the rectifier circuit illustrated in FIG. 3. FIG. 5 is a diagram illustrating in close-up a part of the timing chart illustrated in FIG. 4, to explain it in detail, and used to explain the operation of the rectifier circuit after the oscillation frequency of an oscillator is stabilized. A rectifier circuit 100 according to this embodiment rectifies an AC input voltage Vin applied to an input terminal IN and outputs it from an output terminal OUT as an output voltage Vout.

The rectifier circuit 100 includes an n-channel MOS (nMOS) transistor Q1, a capacitor C1, a control signal generation unit 500, and a booster circuit 7, as illustrated in FIG. 3. The control signal generation unit 500 generates and outputs a control signal SSin to a timing control circuit 6, and controls connection and disconnection (ON/OFF) of the nMOS transistor Q1 via the booster circuit 7.

The control signal generation unit 500 includes a reference voltage generator 1, an oscillator 2, a comparator 3, a digital timer 4, a pulse generator (analog timer) 5, a timing control circuit 6, an inverter I1, a NOR gate NOR1, an OR gate OR1, and an AND gate AND1. NOR1 and OR1 function as a switch circuit 8 which performs switching between analog control using a pulse signal PULSE from the pulse generator 5 and digital control using an output (digital signal) GCTd of the digital timer 4, based on an enable signal CEBL.

The nMOS transistor Q1 may be turned on during the period of an AC input voltage Vin higher in digital control using the digital signal GCTd than in analog control using the pulse signal PULSE. The capacitor C1 is used to smooth the rectified output voltage Vout (VDD) (maintain it constant).

The nMOS transistor Q1 is placed between the input terminal IN and the output terminal OUT, and a gate control signal GCTL boosted by the booster circuit 7 is input to its control electrode (gate). In other words, the transistor Q1 functions as a switch element, undergoes ON/OFF control based on the gate control signal GCTL, and rectifies the AC input voltage Vin to generate an output voltage Vout. The nMOS transistor Q1 is used as a switch element in this case, so that its size may be smaller and a current may be supplied in larger amounts than in the use of a pMOS transistor. Although a diode D1 is connected between the source and the drain of the transistor Q1, the timing at which the transistor Q1 is turned on is the highest voltage (peak) portion of the AC input voltage Vin and conduction loss generated by the diode D1 is negligible, as will be described later.

The pulse generator 5 serves as a circuit which generates a pulse signal (analog pulse) PULSE to turn on the nMOS transistor Q1 during the period of a possible high AC input voltage Vin (the neighborhood of the highest voltage). When the rectifier circuit 100 according to this embodiment is applied to, e.g., an RFID tag (electronic device 150), as long as radio waves from a reader have a known frequency (e.g., 13.56 MHz), the pulse generator 5 generates a signal PULSE corresponding to the radio waves from the reader.

The digital timer 4 receives a clock CLK from the oscillator 2, a power supply voltage VDD (output voltage Vout), and a signal SS1 output from the comparator 3, and generates and outputs an enable signal CEBL and a digital signal GCTd. The digital timer 4 is used to generate a signal for defining a range (narrow period) closer to the highest AC input voltage Vin than the analog pulse PULSE from the pulse generator 5 to improve the accuracy of the ON period of the nMOS transistor Q1.

The switch circuit 8 performs ON/OFF control of the nMOS transistor Q1 by analog control based on the analog pulse PULSE from the pulse generator 5, for example, immediately after the startup of a power supply. The switch circuit 8 further performs ON/OFF control of the nMOS transistor Q1 by switching from the above-mentioned analog control to digital control based on the digital signal (count value) GCTd from the digital timer 4, for example, after the oscillation frequency of the internal oscillator 2 is stabilized.

As illustrated in FIG. 4, for example, immediately after the startup of a power supply, the enable signal CEBL from the digital timer 4 is at low level "L." Thus, the output of the switch circuit 8 (OR gate OR1) becomes a signal (PULSE) obtained as the analog pulse PULSE from the pulse generator 5 is inverted twice by the inverter I1 and the NOR gate NOR1.

After the oscillation frequency of the oscillator 2 is stabilized, the enable signal CEBL changes from "L" to high level "H" and the output of the switch circuit 8 becomes a digital signal GCTd from the digital timer 4 via the OR gate OR1. As a result, the output (control signal) SSin of the AND gate AND1 becomes a signal having the same logic as that of the output of the switch circuit 8 during the period in which the signal SS1 output from the comparator 3 is at "H."

With this operation, the gate control signal GCTL for ON/OFF control of the nMOS transistor Q1 acts as a signal based on the analog pulse PULSE immediately after the startup of a power supply and as a signal based on the digital signal GCTd after the oscillation frequency of the oscillator 2 is stabilized. In other words, as indicated by Vout in FIG. 4, a higher output voltage Vout may be generated after the oscillation frequency of the oscillator is stabilized than immediately after the startup of a power supply. FIG. 4 also illustrates an output voltage Vout' generated by the rectifier circuits 200 and 300 described with reference to FIG. 1 to FIG. 2B, for comparison. In other words, with the rectifier circuit 100 according to this embodiment, obviously, an output voltage Vout higher than the output voltage Vout' illustrated in FIG. 1 to FIG. 2B may be generated not only after the oscillation frequency of the oscillator is stabilized, but also immediately after the startup of a power supply.

The booster circuit 7 receives a delay signal DELAY, a capacitance control signal CTL, and a boosting signal BST from the timing control circuit 6, and the power supply voltage VDD (output voltage Vout) and outputs the boosted gate control signal GCTL to the gate of the nMOS transistor Q1. The booster circuit 7 includes a level shifter 71, a regulator 72, a pMOS transistor Q2, a capacitor C2, inverters I2 and I3, and a diode D2, as illustrated in FIG. 3.

The booster circuit 7 is used to, e.g., raise a signal level of about 2 V to about 3 to 4 V that is higher (sufficiently higher) than the threshold voltage (Vthn) of the nMOS transistor Q1 to reliably turn on the nMOS transistor Q1 to suppress any conduction loss. The capacitor C2 is used to accumulate charges of a signal BOOST output from the inverter I3 controlled by the regulator 72 and boost the delay signal DELAY via the pMOS transistor Q2 to generate a gate control signal GCTL.

The level shifter 71 receives the capacitance control signal CTL, makes a level shift, and generates a capacitance control signal CCTL for ON/OFF control of the pMOS transistor Q2. The diode D2 is connected between the source and the drain of the transistor Q2. A boosting signal BOOST is generated using the boosting signal BST via the inverter I2 and the inverter I3 controlled by the regulator 72. The booster circuit 7 illustrated in FIG. 3 is merely an example, and various modifications and changes may be made, as a matter of course.

As illustrated in FIG. 5, after the oscillation frequency of the oscillator 2 is stabilized (after CEBL changes from "L" to "H"), when the AC input voltage Vin exceeds a reference voltage VREF, the signal SS1 output from the comparator 3 changes from "L" to "H." The timing signal SSin input to the timing control circuit 6 is a signal based on the digital signal GCTd from the digital timer 4. The timing control circuit 6 generates a delay signal DELAY, a capacitance control signal CTL, and a boosting signal BST using three delay circuits 61 to 63, as will be described in more detail later with reference to FIG. 10.

The delay signal DELAY is applied to the gate (one end of the capacitor C2) of the nMOS transistor Q1 upon turn-on of the pMOS transistor Q2, boosted by the boosting signal BOOST applied to the other end of the capacitor C2, and generated as a gate control signal GCTL. The gate control signal GCTL is boosted to a voltage higher than the threshold voltage Vthn of the nMOS transistor Q1 to perform ON/OFF control of the transistor Q1 while reducing the conduction loss upon rectification.

Figure 6:
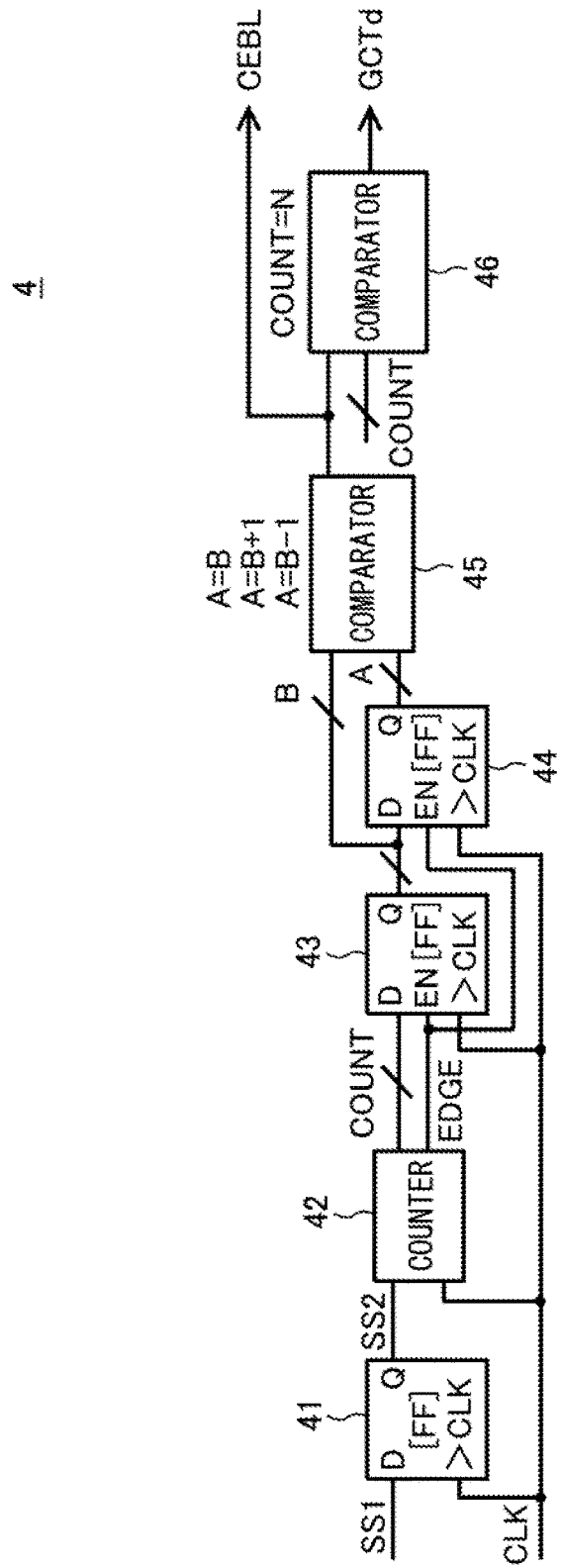
FIG. 6 is a block diagram illustrating one exemplary digital timer in the rectifier circuit illustrated in FIG. 3.
Figure 7:
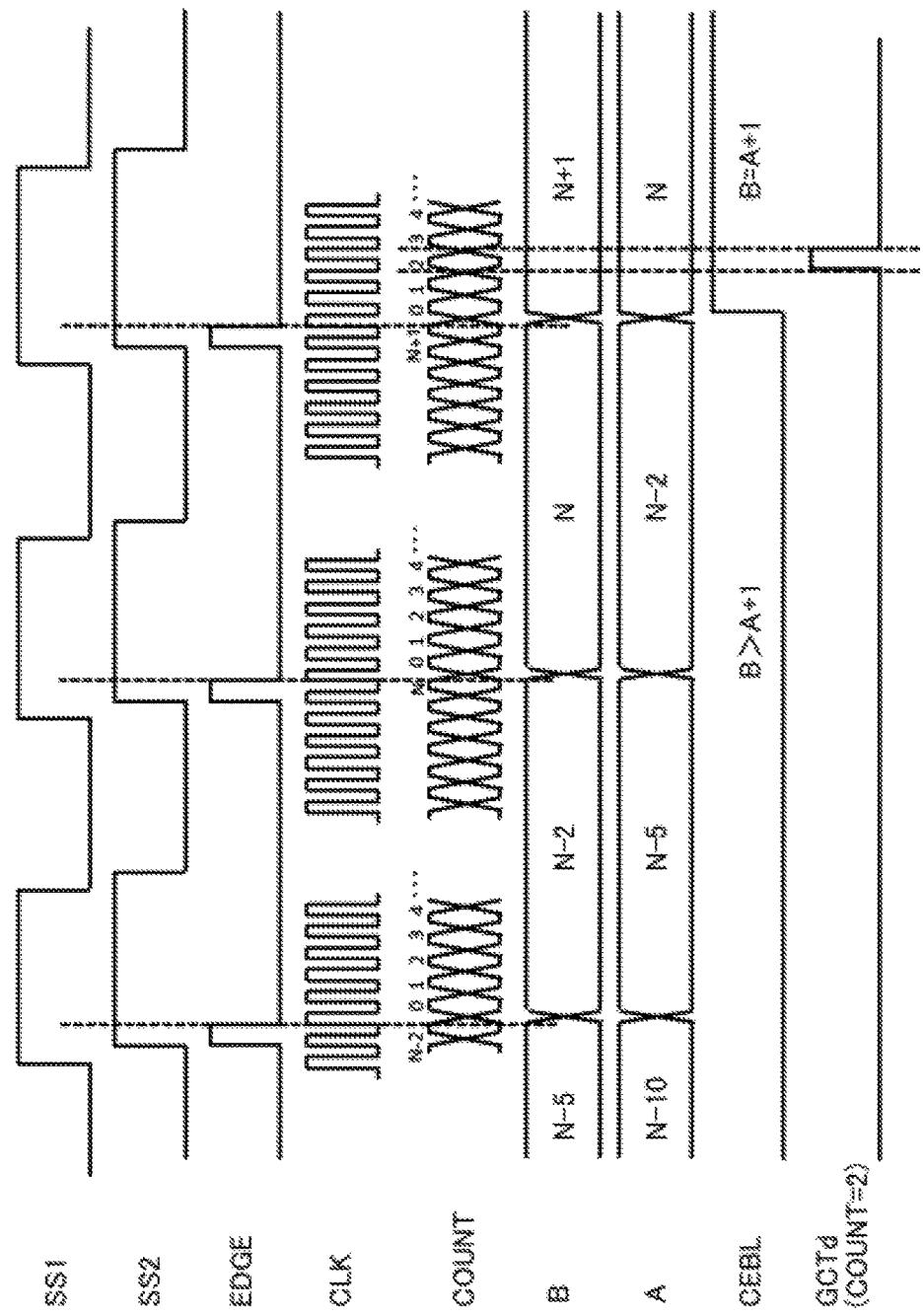
FIG. 7 is a timing chart for explaining the operation of the digital timer illustrated in FIG. 6.

FIG. 6 is a block diagram illustrating one exemplary digital timer in the rectifier circuit illustrated in FIG. 3, and FIG. 7 is a timing chart for explaining the operation of the digital timer illustrated in FIG. 6. The digital timer 4 receives the clock CLK from the oscillator 2 and the signal SS1 from the comparator 3 and generates an enable signal CEBL and a digital signal GCTd.

The digital timer 4 includes flip-flops (FFs) 41, 43, and 44, a counter 42, and comparators 45 and 46, as illustrated in FIG. 6. For example, it takes a certain time for the oscillation frequency of the oscillator 2 to stabilize after the startup of a power supply, as described earlier. In view of this, the digital timer 4 includes the function of detecting that the oscillator has stabilized and outputting an enable signal CEBL, and the function of outputting a digital signal GCTd for generating a gate control signal GCTL for the nMOS transistor Q1 by digital control.

The flip-flop 41 captures and holds the signal SS1 input to the D (Data) terminal in accordance with the clock CLK and outputs it from the Q terminal as a signal SS2. The signal SS2 corresponds to a signal obtained by delaying the signal SS1 by one period of the clock CLK, as illustrated in FIG. 7. The signal SS2 is input to the counter 42 and counted by the clock CLK to generate a count value COUNT and a transition signal EDGE representing the leading edge of the signal SS2.

The count value COUNT and the transition signal EDGE from the counter 42 are input to the D terminal and the EN (ENable) terminal of the flip-flop 43. The count value COUNT is also input to the comparator 46 and the transition signal EDGE is also input to the EN terminal of the flip-flop 44. In other words, the flip-flop 43 captures and holds the count value COUNT input to the D terminal in accordance with the clock CLK and outputs it from the Q terminal as a signal B, when the transition signal EDGE is at "H."

The signal B from the flip-flop 43 is input to the D terminal of the flip-flop 44 and the comparator 45. The flip-flop 44 captures and holds the signal B input to the D terminal when the last transition signal EDGE is at "H," in accordance with the clock CLK, and outputs it from the Q terminal as a signal A. The comparator 45 receives the signal A from the flip-flop 44, together with the signal B from the flip-flop 43, and compares the signals A and B with each other.

The comparator 45 captures and compares the signals A and B with each other, and sets the enable signal CEBL at "H" when, for example, A=B, A=B+1, or A=B−1. In other words, an input signal SS1 having a certain period is counted by the clock CLK from the oscillator 2, count values COUNT before and after one period are compared with each other, and the enable signal CEBL is set at "H" after stabilization is determined when the difference in count value falls within the range of ±1. The enable signal CEBL from the comparator 45 is also input to the comparator 46 and compared with the count value COUNT from the counter 42.

The comparator 46 outputs a digital signal GCTd having a predetermined count value (e.g., COUNT=2) in a certain cycle of the clock CLK after the enable signal CEBL changes to "H." In other words, FIG. 7 illustrates an example in which the enable signal CEBL changes to "H" while the count value COUNT is "2." The oscillation frequency of the oscillator 2 (CLK frequency) may be set higher to improve the accuracy of control of the nMOS transistor Q1, but it may be set to about eight to 16 times the frequency of the input voltage Vin (e.g., the frequency of carrier waves from an RFID tag: 13.56 MHz) without any problem. The digital timer 4 described with reference to FIG. 6 and FIG. 7 is merely an example, and various modifications and changes may be made, as a matter of course.

Figure 8:
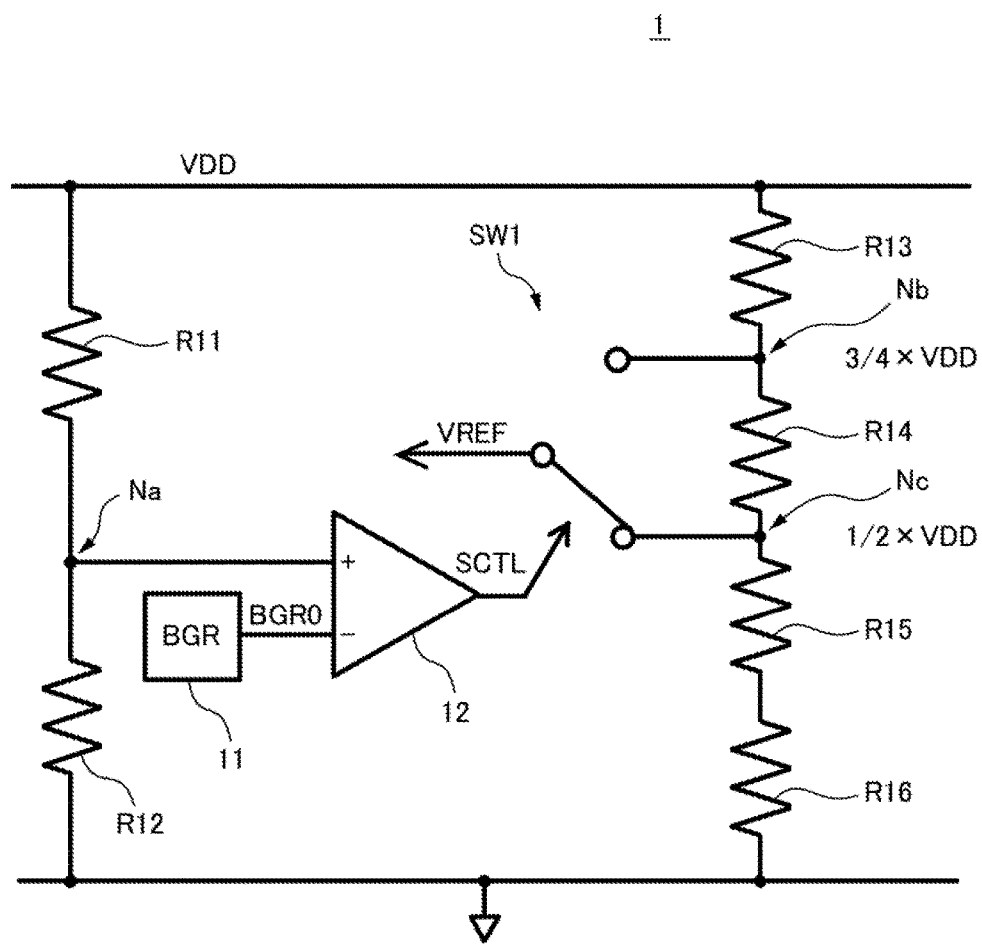
FIG. 8 is a circuit diagram illustrating one exemplary reference voltage generator in the rectifier circuit illustrated in FIG. 3.

FIG. 8 is a circuit diagram illustrating one exemplary reference voltage generator in the rectifier circuit illustrated in FIG. 3. The reference voltage generator 1 has the function of switching the reference voltage VREF from ½×VDD to ¾×VDD, and includes resistors R11 to R16, a switch SW1, a bandgap reference circuit (BGR) 11, and an operational amplifier 12, as illustrated in FIG. 8.

The resistors R11 and R12 are divided so that, for example, a node Na has a voltage equal to a voltage BGR0 output from the bandgap reference circuit 11 when the power supply voltage VDD (output voltage Vout) reaches a desired voltage (e.g., 2 V). The switch SW1 is controlled by the output SCTL of the operational amplifier 12 so that SCTL is set at "L" and ½×VDD is selected when the power supply voltage VDD is 2 V or less, and SCTL is set at "H" and ¾×VDD is selected when VDD is higher than 2 V.

Figure 9A:
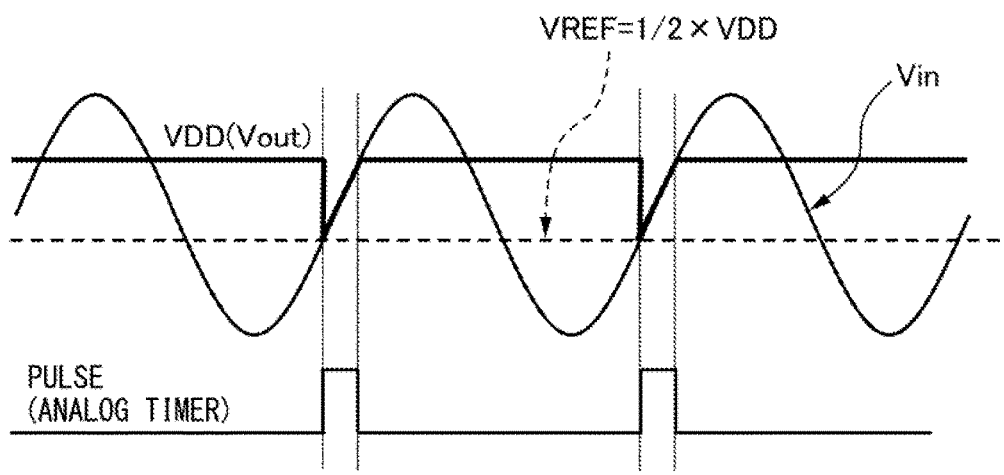
FIG. 9A and FIG. 9B are diagrams for explaining the operation of a comparator based on the output of the reference voltage generator illustrated in FIG. 8.
Figure 9B:
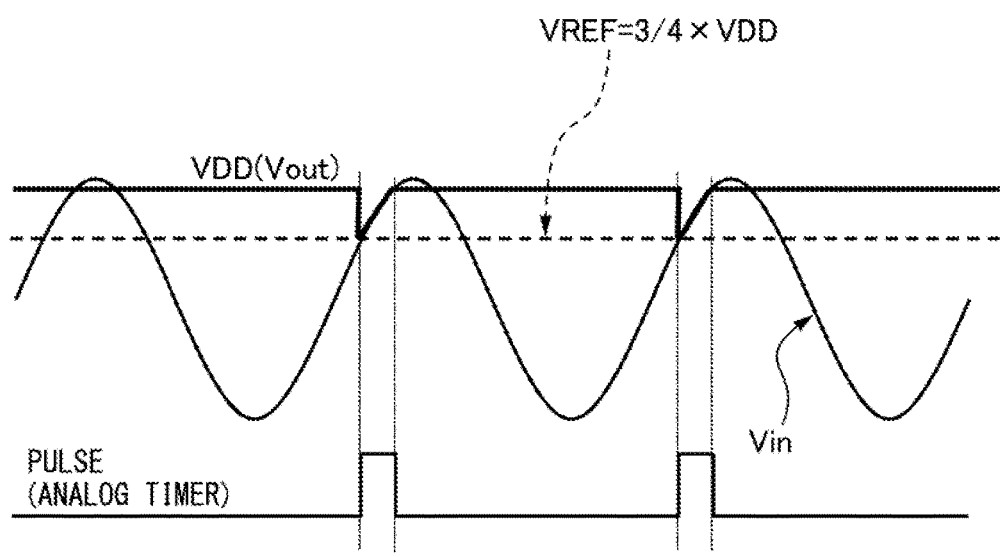

FIG. 9A and FIG. 9B are diagrams for explaining the operation of a comparator based on the output of the reference voltage generator illustrated in FIG. 8. FIG. 9A illustrates the comparison operation of the comparator 3 when the output (reference voltage) VREF of the reference voltage generator 1 is VREF=½×VDD, and FIG. 9B illustrates the comparison operation of the comparator 3 when this output is VREF=¾×VDD. The comparator 3 compares the voltage levels of the reference voltage VREF and the input voltage Vin (e.g., the AC voltage generated by a 13.56-MHz high-frequency signal) with each other.

For example, ½×VDD is assumed to be selected as a reference voltage VREF when the power supply voltage VDD (output voltage Vout) is 2 V or less, as illustrated in FIG. 9A. Further, for example, ¾×VDD is assumed to be selected as a reference voltage VREF when the power supply voltage VDD is higher than 2 V, as illustrated in FIG. 9B.

The comparison between FIG. 9A and FIG. 9B reveals that the ON time of the pulse signal PULSE may be brought closer to the highest voltage (peak) of the input voltage Vin when VREF=¾×VDD in FIG. 9B than when VREF=½×VDD in FIG. 9A. In other words, raising VREF when VDD (Vout) becomes equal to or higher than a certain level allows the comparator 3 to output a signal SS1 by approximation to the peak of Vin to set the output voltage Vout (VDD) higher.

The reference voltage generator 1 described with reference to FIG. 8 to FIG. 9B may switch the reference voltage VREF between two voltage levels: ½×VDD and ¾×VDD, but it is not limited to such an example. In other words, VREF may even be switched among, e.g., four voltage levels: ½×VDD, ⅝×VDD, ¾×VDD, and ⅞×VDD, based on the voltage level of VDD.

Figure 10:
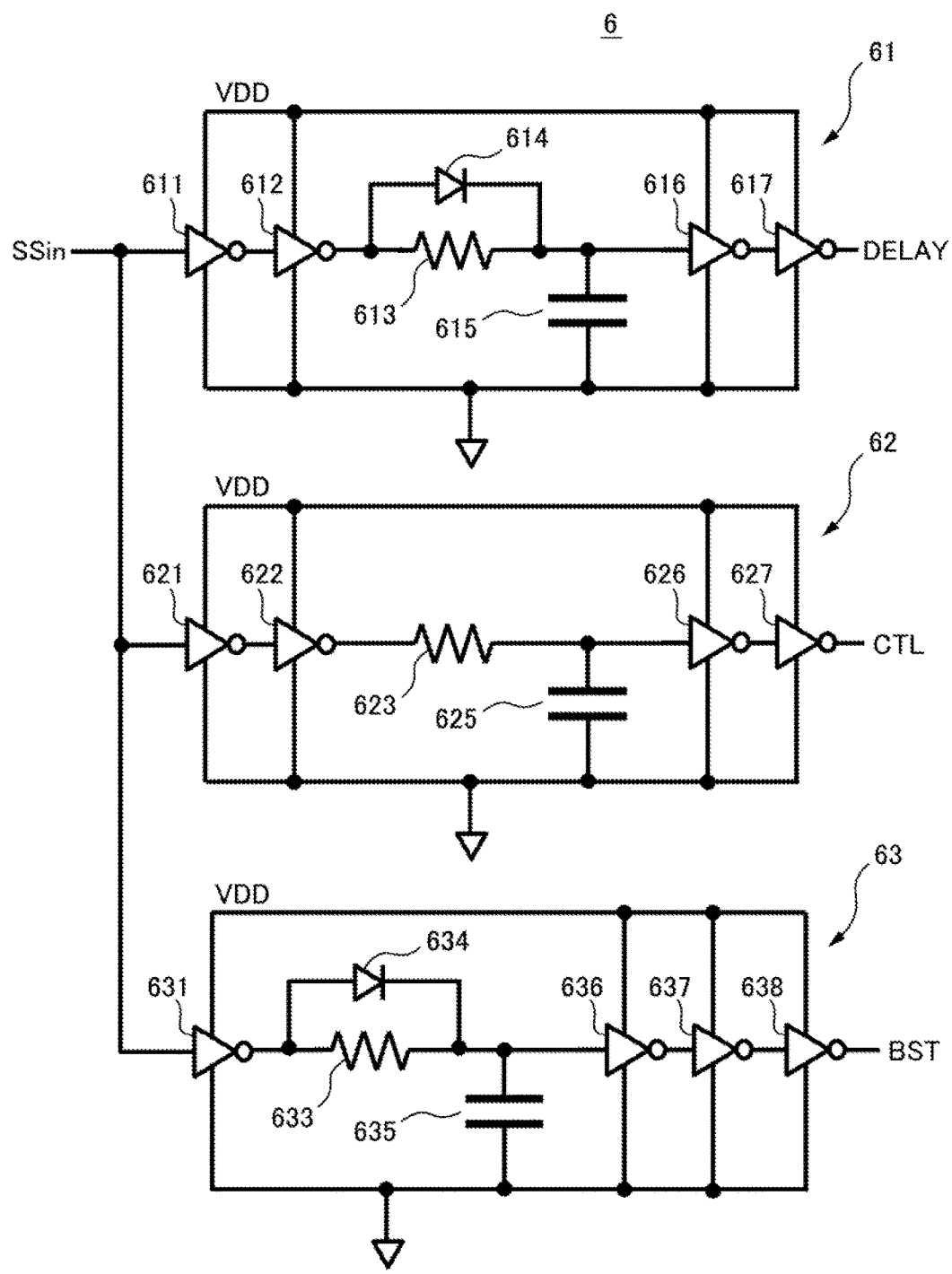
FIG. 10 is a circuit diagram illustrating one exemplary timing control circuit in the rectifier circuit illustrated in FIG. 3.

FIG. 10 is a circuit diagram illustrating one exemplary timing control circuit in the rectifier circuit illustrated in FIG. 3. The timing control circuit 6 includes three delay circuits 61 to 63 which receive the control signal SSin (the output of the AND gate AND1) and generate a delay signal DELAY, a capacitance control signal CTL, and a boosting signal BST, as illustrated in FIG. 10. The delay circuit 61 includes inverters 611, 612, 616, and 617, a resistor 613, a diode 614, and a capacitor 615. The delay circuit 62 includes inverters 621, 622, 626, and 627, a resistor 623, and a capacitor 625. The delay circuit 63 includes inverters 631, 636, 637, and 638, a resistor 633, a diode 634, and a capacitor 635.

The delay circuits 61 to 63 form filters using the resistors 613, 623, and 633 and the capacitors 615, 625, and 635, respectively, to adjust the delay times using the time constants of the filters. In the delay circuits 61 and 63, the diodes 614 and 634 are connected in parallel to the resistors 613 and 633 to allow the delay signal DELAY and the boosting signal BST to delay only at the leading edges. In the delay circuit 62, the values of the resistor 623 and the capacitor 625 are set to delay both the leading and trailing edges of the capacitance control signal CTL to obtain respective desired delay times. The configuration of the timing control circuit 6 is not limited to that illustrated in FIG. 10, either, as a matter of course.

Figure 11:
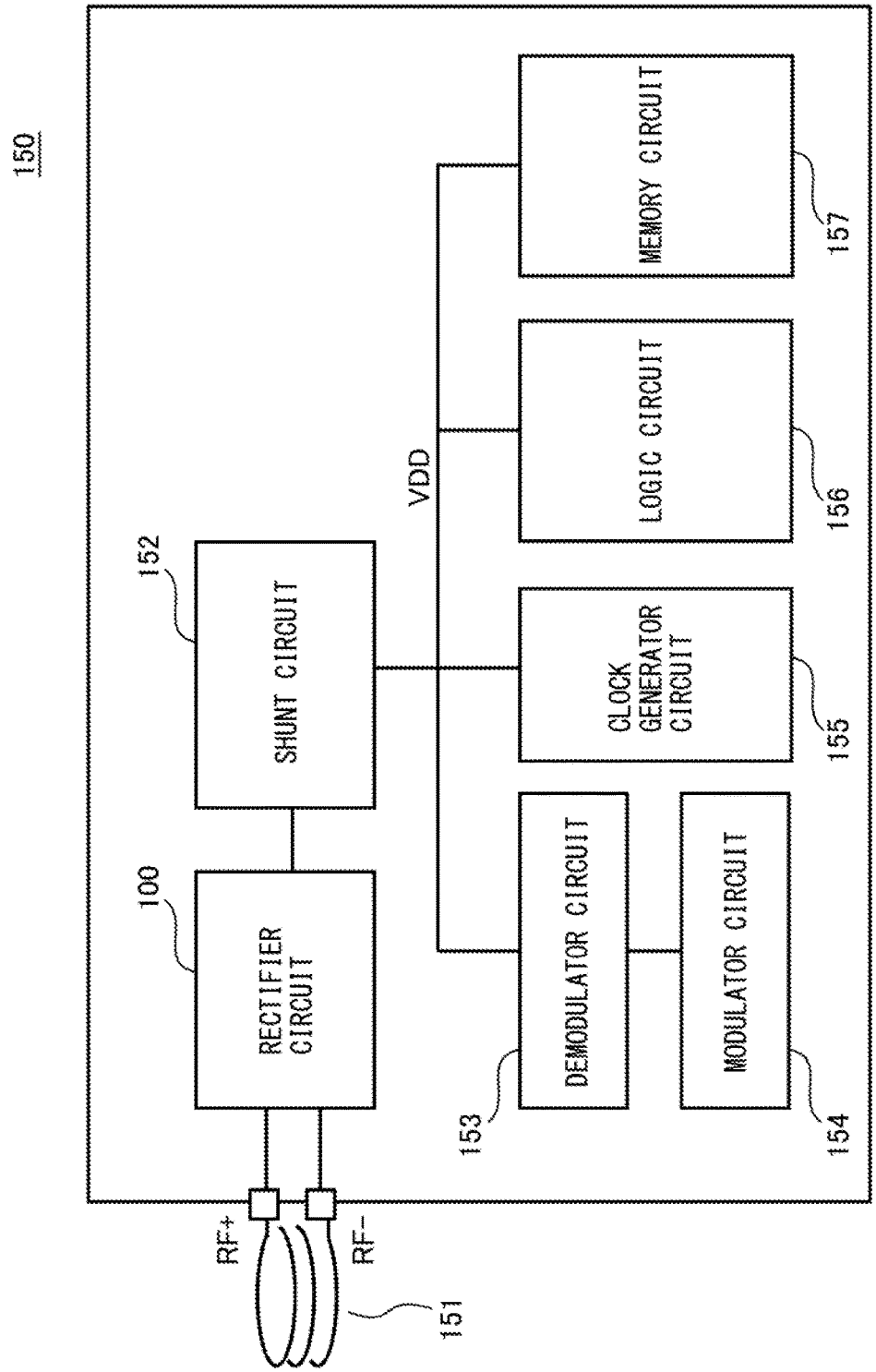
FIG. 11 is a block diagram illustrating one exemplary electronic device to which one embodiment of a rectifier circuit is applied.

FIG. 11 is a block diagram illustrating one exemplary electronic device to which one embodiment of a rectifier circuit is applied, and illustrates one exemplary RFID tag. The RFID tag 150 includes an antenna (coil) 151, the rectifier circuit 100 of the above-described embodiment, a shunt circuit 152, a demodulator circuit 153, a modulator circuit 154, a clock generator circuit 155, a logic circuit 156, and a memory circuit 157, as illustrated in FIG. 11. The RFID tag 150 may include various sensors, including, e.g., a temperature sensor and a humidity sensor, store data from the sensors in the memory circuit 157, and send the data in response to requests from a reader-writer (reader).

The RFID tag 150, for example, receives via the antenna 151, a high-frequency (RF) signal emitted by the reader-writer and inputs an AC signal (input voltage Vin) from the terminals RF+ and RF− of the antenna 151 to the rectifier circuit 100. In other words, the input voltage Vin is a voltage based on radio waves emitted by the reader (reader-writer). The rectifier circuit 100 converts an AC input voltage Vin into a DC voltage (an output voltage Vout or a power supply voltage VDD) and controls the power supply voltage VDD at a certain level using the shunt circuit (shunt regulator) 152, as described above.

The power supply voltage VDD stabilized by the shunt circuit 152 is applied to, e.g., the demodulator circuit 153, the modulator circuit 154, the clock generator circuit 155, the logic circuit 156, and the memory circuit 157, which perform respective predetermined operations. In other words, the demodulator circuit 153 demodulates a signal received from the antenna 151 (RF+, RF−), operates the logic circuit 156 in accordance with a clock generated by the clock generator circuit 155, and performs read/write of the memory circuit 157. The modulator circuit 154 is used to, e.g., modulate the data held in the memory circuit 157 and send the data to the reader-writer via the antenna 151.

The rectifier circuit 100 according to this embodiment is not limited to application to the RFID tag 150 illustrated in FIG. 11, and is widely applicable to various electronic devices involving low power consumption, including, e.g., noncontact IC cards.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A rectifier circuit comprising a switch element, which controls connection and disconnection of an AC input voltage using the switch element to generate an output voltage, wherein
   the switch element comprises an n-channel MOS transistor, and
   the rectifier circuit further comprises:
      a booster circuit configured to generate and apply a gate control signal including a voltage higher than a threshold voltage of the n-channel MOS transistor to a gate of the n-channel MOS transistor; and
      a control signal generation unit configured to generate and output a control signal for controlling connection and disconnection of the n-channel MOS transistor to the booster circuit, and
   establishes connection to the switch element at a peak portion of the input voltage.

2. The rectifier circuit according to claim 1, wherein the control signal generation unit comprises:
   a pulse generator configured to generate an analog pulse;
   an oscillator configured to generate a clock; and
   a digital timer configured to generate a digital signal based on the clock.

3. The rectifier circuit according to claim 2, wherein the control signal generation unit further comprises:
   a timing control circuit configured to receive the output voltage and the control signal, generate a signal by delaying the control signal, and output the generated signal to the booster circuit.

4. The rectifier circuit according to claim 2, wherein the control signal generation unit further comprises:
   a reference voltage generator configured to generate a reference voltage; and
   a comparator configured to compare the input voltage with the reference voltage,
   the pulse generator generates the analog pulse based on the output voltage and a signal output from the comparator, and
   the digital timer generates the digital signal based on the output voltage and the signal output from the comparator, together with the clock.

5. The rectifier circuit according to claim 4, wherein the digital timer further generates an enable signal for defining whether the control signal is to be generated based on the analog pulse or based on the digital signal.

6. The rectifier circuit according to claim 5, wherein the control signal generation unit further comprises:
   a switch circuit configured to perform switching to generate the control signal based on the analog pulse immediately after startup of a power supply and generate the control signal based on the digital signal after an oscillation frequency of the oscillator is stabilized, based on the enable signal.

7. The rectifier circuit according to claim 6, wherein the n-channel MOS transistor is connected in a portion closer to a peak of the input voltage in digital control based on the digital signal than in analog control based on the analog pulse.

8. The rectifier circuit according to claim 7, wherein the digital timer comprises:
   a counter configured to count the clock generated by the oscillator, and generate the digital signal based on a count value obtained by the counter.

9. The rectifier circuit according to claim 4, wherein the reference voltage generator generates the reference voltage by switching between different voltage levels.

10. The rectifier circuit according to claim 9, wherein the reference voltage generator generates the reference voltage by switching to a voltage level closer to the output voltage with an increase in the output voltage.

11. The rectifier circuit according to claim 1, wherein the booster circuit generates the gate control signal based on the output voltage and a signal generated by delaying the control signal.

12. The rectifier circuit according to claim 1, wherein the rectifier circuit further comprises:
   a capacitor configured to smooth the output voltage.

13. An electronic device comprising a rectifier circuit including a switch element, configured to control connection and disconnection of an AC input voltage using the switch element to generate an output voltage, wherein
   the switch element includes an n-channel MOS transistor, and
   the rectifier circuit further includes:
      a booster circuit configured to generate and apply a gate control signal including a voltage higher than a threshold voltage of the n-channel MOS transistor to a gate of the n-channel MOS transistor; and
      a control signal generation unit configured to generate and output a control signal for controlling connection and disconnection of the n-channel MOS transistor to the booster circuit, and
   establishes connection to the switch element at a peak portion of the input voltage.

14. The electronic device according to claim 13, wherein the electronic device comprises an RFID tag, and
   the input voltage comprises a voltage based on a radio wave emitted by a reader.

* * * * *